United States Patent [19]

Tanimoto

[11] Patent Number: 4,675,733
[45] Date of Patent: Jun. 23, 1987

[54] BANDWIDTH COMPRESSION SYSTEM

[76] Inventor: Masayuki Tanimoto, 21-103, Aioiyama-Danchi, 149, Hisakata 1-Chome, Tenpaku-Ku, Nagoya City, Aichi Pref., Japan

[21] Appl. No.: 708,455

[22] Filed: Mar. 5, 1985

[30] Foreign Application Priority Data

Sep. 4, 1984 [JP] Japan .................................. 59-183817

[51] Int. Cl.⁴ .......................... H04N 7/12; H04N 7/18
[52] U.S. Cl. .................................... 358/138; 358/105; 358/133; 358/136
[58] Field of Search ............... 358/133, 135, 136, 138, 358/141, 160, 167, 105

[56] References Cited

U.S. PATENT DOCUMENTS

| 4,090,221 | 5/1978 | Connor | 358/136 X |
| 4,218,704 | 8/1980 | Netravali et al. | 358/136 |
| 4,488,175 | 12/1984 | Netravali | 358/136 |
| 4,605,963 | 8/1986 | Reitmeier et al. | 358/135 X |

Primary Examiner—E. A. Goldberg
Assistant Examiner—Patrick W. Foster
Attorney, Agent, or Firm—Sughrue, Mion, Zinn, Macpeak, and Seas

[57] ABSTRACT

From a high definition television signal of a field are derived basic pixels whose number is a quarter of the whole number of pixels of an original image, motional areas in the image are detected by comparing the basic pixels in the relevant field with corresponding basic pixels in the preceding frame, pixels in the motional areas are selected as additional pixels together with information representing positions of additional pixels in the image, and the basic and additional pixels and the position information are transmitted in time division multiplex mode in such a manner that the basic and additional pixels can be separated from each other at a receiver end without the position information. At the receiver end, when the position information is detected correctly, an image is reconstructed by the received basic and additional pixels under the control of the received position information, whereas when the position information is not detected correctly, an image is reconstructed only from the received basic pixels.

27 Claims, 10 Drawing Figures

○ $4n^{th}$ Field   □ $(4n+1)^{th}$ Field
● $(4n+2)^{th}$ Field   ■ $(4n+3)^{th}$ Field ● --- Pixel in Even Field    ○,□ --- Deleted Pixel
■ --- Pixel in Odd Field

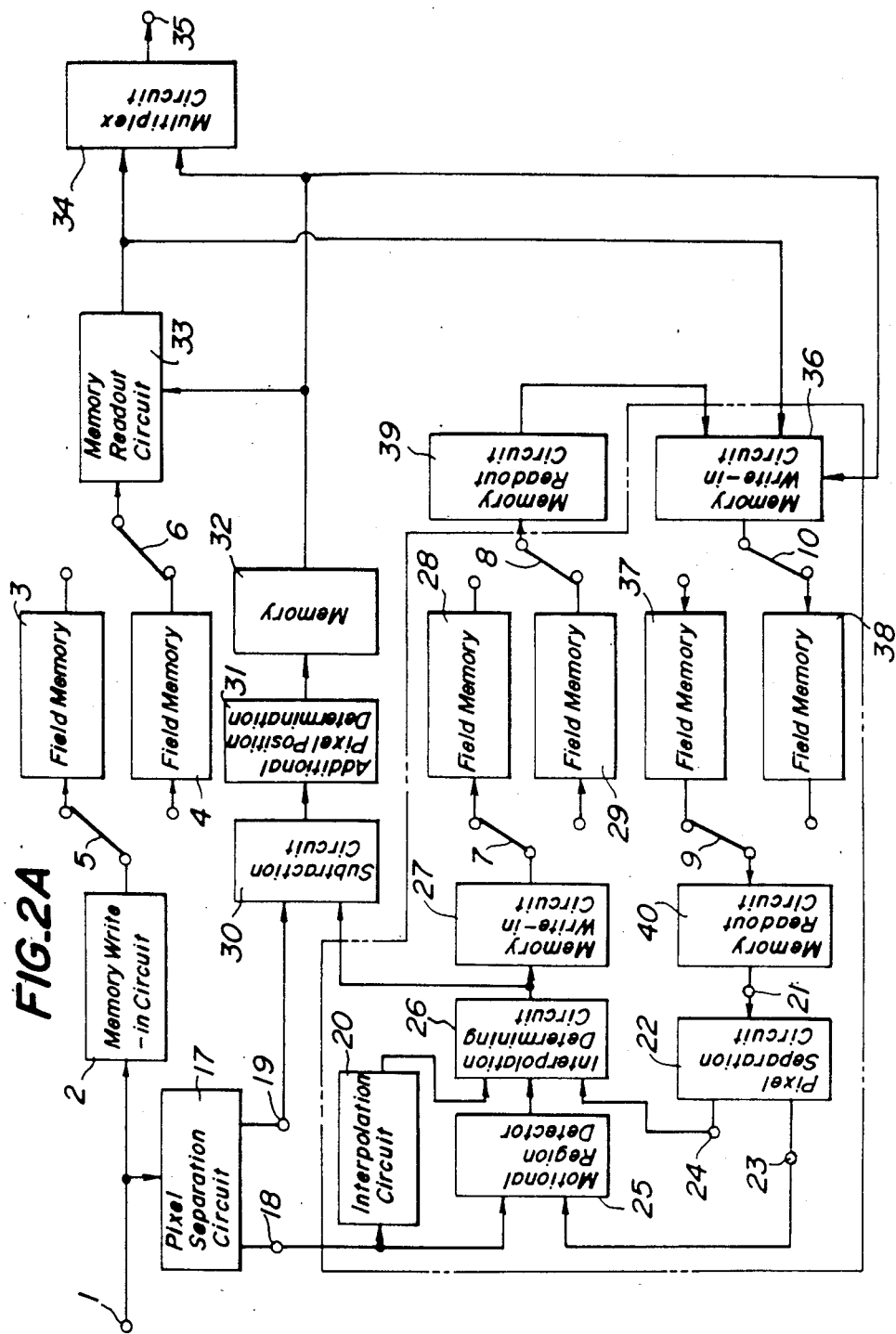

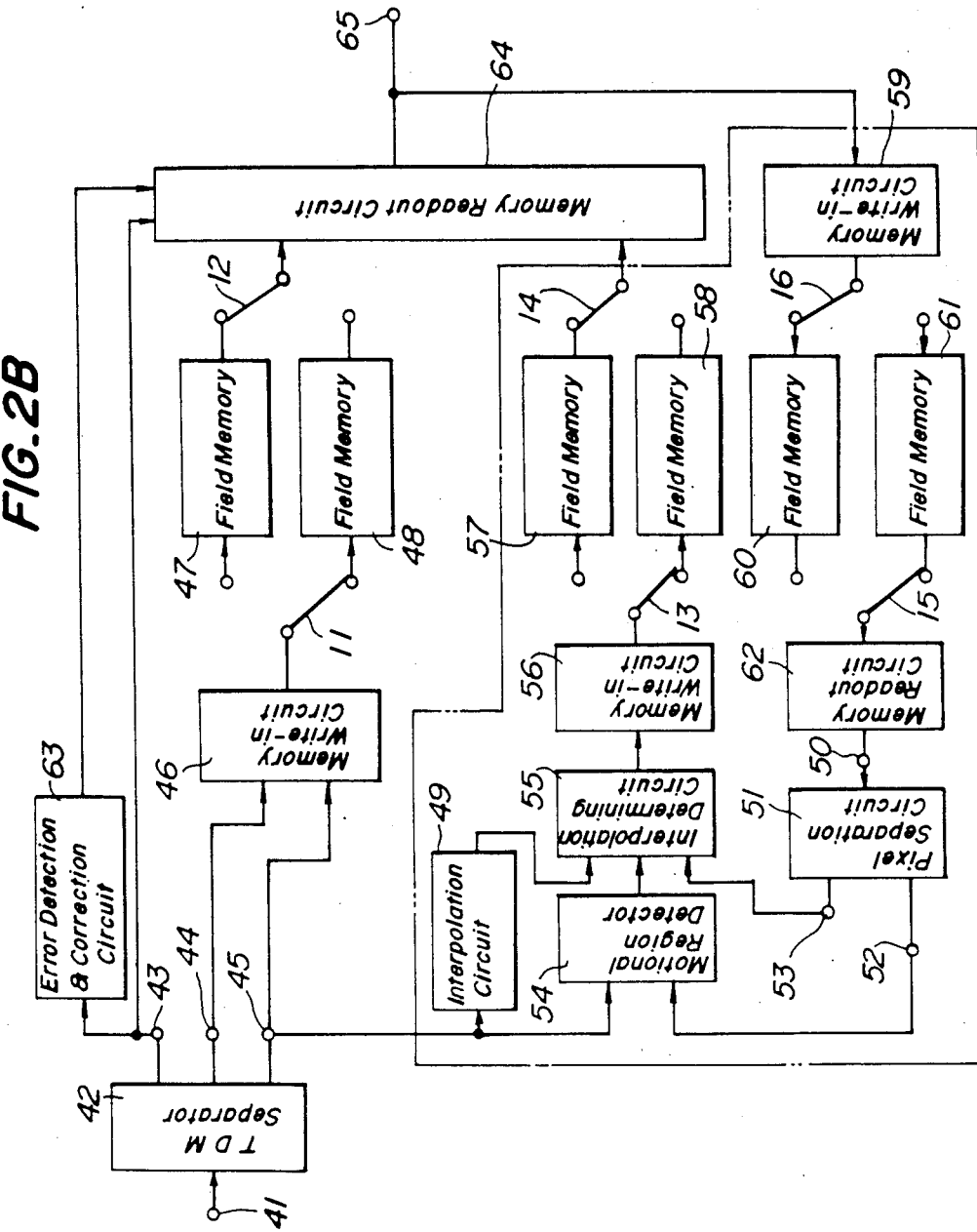

BANDWIDTH COMPRESSION SYSTEM

BACKGROUND OF THE INVENTION

The present invention relates to a frequency bandwidth compression system for use in a transmission or a recording of a picture signal.

In general, in case of transmitting or recording a picture signal, an analog system is superior to a digital system in view of the efficiency of frequency. Therefore, broadcasting of a high definition television signal with the aid of a broadcasting satellite is going to be carried out by the FM system. A frequency bandwidth of the high definition television signal has 20 MHz and therefore, a frequency bandwidth of about 60 MHz is required in order to transmit the television signal by the FM system. However, in practice, since the frequency bandwidth of the broadcasting satellite is allotted only to 27 MHz per channel, two or more channels are required for the high definition television broadcasting. This is apparently quite uneconomical.

If the frequency bandwidth of the high definition television signal could be reduced smaller than 9 MHz, i.e. when the bandwidth can be compressed to 45 percent of the original one, the television signal could be transmitted over a single channel in the FM mode. Therefore, it has been earnestly desired to develop a new bandwidth compression system which satisfies the above mentioned requirement. For instance, in an article TEBS95-2 published at a congress held by The Television Society of Japan in March, 1984 and entitled as "Transmission System for High Definition Television Signal by Single Channel of Satellite" Ninomiya, Ohtsuka and Izumi have reported a so-called MUSE system in which the frequency bandwidth of the high definition television signal is reduced to 8.1 MHz and therefore high definition television broadcasting could be performed with the aid of a single channel of the broadcasting satellite. However, in the MUSE system there is a serious drawback that a definition of a moving area in an image is decreased. This will now be explained in detail with reference to FIG. 1.

FIG. 1 is a sampling pattern showing a principle of the known MUSE system. In FIG. 1, a solid line indicates a scanning line of an even field and a broken line denotes a scanning line of an odd field. That is to say, when n is assumed to be an integer number, a mark o denotes sampling points in $4n^{th}$ field, □ in $(4n+1)^{th}$ field, • in $(4n+2)^{th}$ field and a mark represents sampling points in $(4n+3)^{th}$ field. Further, a mark x depicts sampling points which are not transmitted, i.e. deleted pixels. After the high definition television signal has been sampled at a sampling frequency of 64.8 MHz, the pixels denoted by the mark x are uniformly deleted or removed. Then, the number of pixels is reduced to one half of that of the original high definition television signal. A reduction in an image quality due to this pixel deletion can be almost ignored due to the fact that the original sampling frequency is sufficiently high with respect to the signal bandwidth. Next, the remaining pixels are transmitted over four fields as illustrated in FIG. 1. Then, a time period of successively transmitted pixels is equal to 1/16.2 MHz. In this manner, the bandwidth of the high definition television signal is reduced to 8.1 MHz. In this known MUSE system, the pixels are uniformly deleted in each field. In a receiver end, the pixels which have been transmitted over four fields are composed in a frame memory. In a still portion of an image, it is possible to reproduce an image having a sufficiently high definition. However, in a moving portion of the image, since pixels which have not been transmitted are derived by an interpolation by using the pixels which have been transmitted in a relevant field, it is impossible to reproduce a detail in the image and thus the resolution is decreased to a great extent.

As explained above, in the known bandwidth compression system, since the image is reproduced by composing in the frame memory the pixels which are transmitted slowly after decomposing the image, the moving picture could not be reproduced in detail, though the still picture can be reconstructed faithfully. Therefore, the known system could not be applied effectively to a bandwidth compression device and a recording device for processing the moving picture and a still video recorder for recording still image.

SUMMARY OF THE INVENTION

The present invention has for its object to provide a novel and useful system for compressing a bandwidth of an image signal, by means of which not only a still picture image, but also a moving picture image can be reproduced faithfully with a high definition.

It is still another object of the invention to provide a bandwidth compression system which can be advantageously used in the high definition television transmission with the aid of a single channel of a broadcasting satellite.

According to the invention, a system for compressing a bandwidth of an image signal comprises:

at a transmitter end
  deriving from an original image basic pixels whose positions in the image have been predetermined;
  deriving from the original image additional pixels whose positions are varied in accordance with a property of the original image;
  deriving position signals of the additional pixels; and
  transmitting the basic and additional pixels and position signals of the additional pixels in such a manner that the basic and additional pixels can be separated from each other without the position signals; and at a receiver end
  separating the transmitted basic and additional pixels and position signals from each other; and
  reconstructing an image from both the basic and additional pixels under the control of the position signals when there is no error in the position signals and from only the basic pixels when there is an error in the position signal.

According to the invention, the original image is sampled roughly in accordance with a predetermined sampling pattern to derive pixels which represent basic or principal construction of the image (basic pixels), and then pixels which are required for representing a detail of the image (additional pixels) are derived from the remaining pixels together with positional information of the additional pixels. In this case, a sum of the numbers of the derived basic and additional pixels should be smaller than the number of pixels of the original picture. The basic and additional pixels and positional information are transmitted to the receiver end in such a manner that at the receiver end the basic and additional pixels can be separated from each other without the aid of the positional information. Therefore, even if there is produced an error in the positional information, it is possible to reconstruct the picture only from the basic pixels. That is to say, when the positional information is detected to be correct, the image having a high definition can be reconstructed from both the basic and additional pixels, whereas when the positional information is found to be erroneous, the picture is reconstructed only from the basic pixels.

BRIEF DESCRIPTION OF THE DRAWINGS

FIGS. 2A and 2B are block diagrams illustrating transmitter and receiver ends, respectively of a high definition television signal transmission system using the bandwidth compression system according to the invention;

DESCRIPTION OF THE PREFERRED EMBODIMENTS

An embodiment of the bandwidth compression system according to the invention will be explained with reference to FIGS. 2, 3 and 4. This embodiment is applied to the high definition television broadcasting through a satellite. It should be noted that in the present embodiment, determination of additional pixels at a transmitter end and reconstruction of image at a receiver end are effected by utilizing transmitted and reproduced image signals of a previous frame. However, the present invention is not limited to such an embodiment and positions of additional pixels of a field and the reconstruction of the image can be determined only by an image signal of a relevant field.

FIGS. 2A and 2B are block diagram showing a transmitter end and a receiver end, respectively for carrying out the high definition television signal bandwidth compression system according to the invention. FIG. 3 is a schematic view illustrating an arrangement of sampling points, and FIG. 4 is a schematic view depicting a format of a transmitted television signal of one field.

Figure 1:
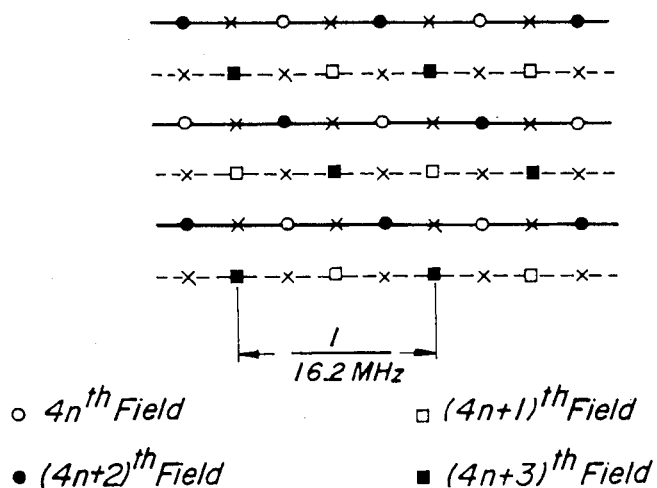
FIG. 1 is a schematic view showing a sampling pattern of an image signal for explaining the known bandwidth compression system.
Figure 3A:
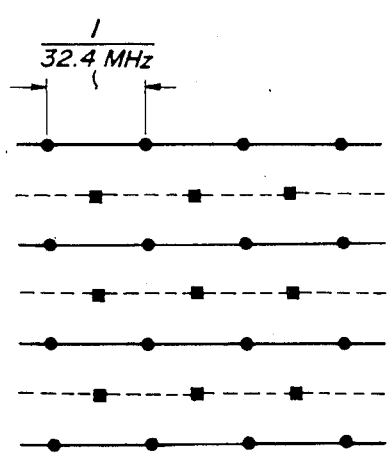
FIG. 3A is a schematic view illustrating a sampling pattern of a high definition television signal whose bandwidth is to be compressed.
Figure 3B:
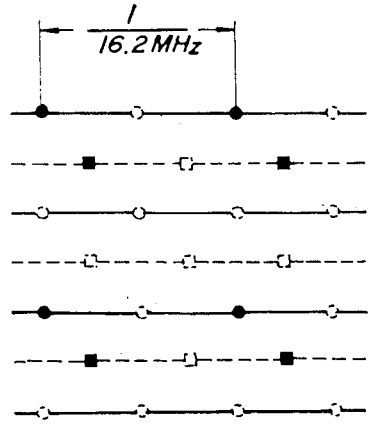
FIG. 3B is a schematic view depicting a sampling pattern of basic pixels according to the invention.
Figure 4:
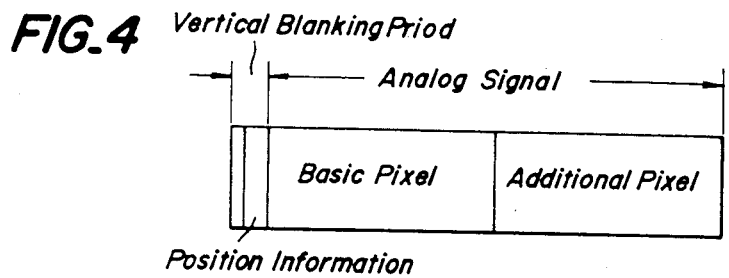
FIG. 4 is a schematic view showing a format of a compressed television signal of one field according to the invention.

In the present embodiment, the number of pixels of the high definition television signal sampled at a sampling frequency of 64.8 MHz is reduced to a half by means of a known technique to obtain a sampling pattern shown in FIG. 3A. Then, the number of pixels is further reduced to one half and the frequency bandwidth is reduced to 8.1 MHz by means of the bandwidth compression system according to the invention.

FIG. 2A is a block diagram showing the construction of the transmitter end for carrying out the frequency bandwidth compression system according to the invention. To an input terminal 1 is supplied an image signal having the sampling pattern illustrated in FIG. 3A. The input image signals of even and odd fields are alternatively written in field memories 3 and 4, respectively by means of a memory write-in circuit 2. Switches 5, 6, 7, 8, 9, 10, 11, 12, 13, 14, 15 and 16 are provided which are driven at a rate of field period. The input image signal is further supplied to a pixel separation circuit 17 in which pixels are separated into basic pixels having a sampling pattern shown in FIG. 3B and the other pixels (deleted pixels). The basic pixels are supplied at a terminal 18 and the deleted pixels are supplied at a terminal 19, respectively. In the present embodiment, the number of basic pixels is equal to a quarter of the whole number of pixels of the input image signal and the number of the deleted pixels is equal to three quarters of the whole number of pixels. The basic pixels are supplied to an interpolation circuit 20 in which pixels corresponding to the deleted pixels are interpolated by weight average values of neighboring basic pixels.

As will be explained later, at a terminal 21 there is supplied a reconstructed picture signal of a preceeding frame. The reconstructed picture signal is supplied to a pixel separation circuit 22 to separate basic pixels from the other pixels. The basic pixels and the remaining pixels are supplied to terminals 23 and 24, respectively. The basic pixels of a relevant field appearing at the terminal 18 and the basic pixels of the preceding frame appearing at the terminal 23 are supplied to a motional region detecting circuit 25 in which differences between corresponding basic pixels of the relevant field and the field of the preceding frame are derived to produce detection signals each of which indicates that each of regions surrounding respective basic pixels is a still region or motional region. That is to say, when a difference between corresponding basic pixels is large, it can be judged that a region surrounding a relevant basic pixel is belonging to the motional region. The detection signal thus generated by the motional region detecting circuit 25 is supplied to an interpolation determining circuit 26 to which the pixels of the relevant field interpolated by the interpolation circuit 20 and the pixels of the preceding frame separated by the pixel separation circuit 22 are also supplied. In the interpolation determining circuit 26, the interpolated values of the delete pixels are determined in the following manner. When the motional region is detected, the interpolated value obtained by the interpolation circuit 20 is derived to effect the interpolation within a field. Contrary to this, when the still region is detected, the pixel value of the preceding frame supplied from the terminal 24 is derived to carry out a so-called interpolation between frame. The interpolated values of the deleted pixels are written in even field memory 28 and odd field memory 29 by means of a memory write-in circuit 27 and a switch 7.

The interpolated values derived from the interpolation determining circuit 26 are further supplied to a subtraction circuit 30 to which the deleted pixels of the relevant field are supplied from the terminal 19. Then differences between values of corresponding pixels are successively derived to produce signals representing amounts of interpolation error, i.e. distortion. The interpolation error signals of respective pixels are supplied to a circuit 31 for determining positions of additional pixels to be transmitted together with the basic pixels. In the present embodiment, the circuit 31 determines the additional pixels the number of which amounts to a quarter of the total number of pixels of the input image signal. The additional pixels are selected in accordance with the interpolation error signals such that the additional pixels have interpolation errors larger than those of non-selected pixels. The circuit 31 also determines positions of the additional pixels in an image. In this case, the image is divided into block each including several pixels, e.g. 2×2 pixels and a sum of absolute values of interpolation errors of pixels in each block is calculated. Then a third of the whole blocks having sums of interpolation errors larger than those of the remaining blocks are determined and pixels in the thus selected blocks are determined as the additional pixels. Then the total number of the additional pixels becomes a quarter of the total number of pixels of the original image signal. The position information thus determined is temporarily stored in a memory circuit 32. The position information may be one bit signal per block. That is to say, when a relevant block is determined to be a block whose pixels are selected as additional pixels, a logic one bit "1" is allocated to the relevant block. These bit signals can be transmitted in a time division multiplex mode during a vertical blanking period in each field.

While the image signal of an even field is written in the even field memory 3, an image signal including basic and additional pixels of a preceding odd field is readout from the odd field memory 4 by means of a switch 6 and a memory readout circuit 33. From the memory 4, the basic pixels and additional pixels are readout in such a manner that they can be separated from each other at a receiver end without the position information of the additional pixels. For instance, the basic pixels are readout first and then the additional pixels are readout in accordance with the position information. The signals thus readout are supplied to a multiplex circuit 34 in which the analog signal of the basic pixels and additional pixels and the position information are inserted in a field in accordance with the time division multiplex mode as shown in FIG. 4. The signal thus composed is supplied to an output terminal 35. It should be noted that there may be inserted an identification signal between the basix pixels and the additional pixels. Further, the basic pixels and additional pixels may be inserted on alternative scanning lines. In the present embodiment, a sum of the numbers of the basic and additional pixels is equal to a half of the whole number of pixels of the image, and thus the frequency bandwidth is compressed to a half of that of the input television signal.

The basic and additional pixels to be transmitted to the receiver end are also stored in even and odd field memories 37 and 38 by means of a memory write-in circuit 36. Now, it is assumed that the basic and additional pixels of an odd field have been stored in the odd field memory 38. Then, the interpolated pixels stored in the field memory 29 are readout by means of a switch 8 and a memory readout circuit 39 and the readout interpolated pixels are written in the field memory 38. The field memory 38, contains the image signal of a preceding field. Similarly, in the field memory 37 is stored the image signal of a field preceding by two fields, i.e. one frame. The image signal stored in the field memory 37 is readout by means of a switch 9 and a memory readout circuit 40 to supply the reconstructed image signal of a preceding frame at the terminal 21.

Now, the construction of the receiver end will be explained with reference to FIG. 2B. At an input terminal 41 is received the bandwidth compressed television signal transmitted from the output 35 of the transmitter end. At first, the received signal is supplied to a separation circuit 42 for the time division multiplex signal and is separated into the position information, additional pixels and basic pixels which are supplied to terminals 43, 44 and 45, respectively. The basic and additional pixels are stored in even and odd field memories 47 and 48 by means of a memory write-in circuit 46 and a switch 11. The construction of a portion of the receiver end surrounded by a chain line is same as that of a portion of the transmitter end surrounded by a chain line, and thus its detailed explanation is omitted. In field memories 57 and 58 are stored the interpolated values of the deleted pixels of even and odd fields, respectively. The position information separated from the incoming signal by the time division multiplex separation circuit 42 is supplied to an error detection and correction circuit 63 in which any error of the position information is detected and corrected. When no error is detected in the position signal, a memory readout circuit 64 reconstructs the original image signal by means of the basic and additional pixels and the interpolated pixels while the position information is utilized to denote the positions of the additional pixels. However, when the position information is found to include an error which could not be corrected, the memory readout circuit 64 reconstructs an image signal only from the basic pixels readout of the field memory 47 or 48 and the interpolated pixels readout of the field memory 57 or 58. That is to say, when the position information cannot be reproduced correctly, the additional pixels are not used for reconstructing the image.

In the present embodiment, the basic pixels are formed by uniformly deleting pixels to a quarter of the whole number of pixels of the original image. But, it should be noted that any desired number of pixels may be deleted as long as a sum of the numbers of basic and additional pixels is smaller than a predetermined compression ratio. Further, from a central portion of the image there may be derived a larger number of basic pixels than from a peripheral portion of the image. Also in the present embodiment, the determination of positions of additional pixels and the reconstruction of the image are effected by also utilizing the reconstructed image of a preceding frame. However, according to the invention, the position of the additional pixels may be determined only by the image signal of a relevant field. In this case, a value of a pixel to be deleted is first calculated from at least two neighboring basic pixels and then the calculated value is compared with an actual value of the relevant pixel. If a difference between these values is large, the relevant pixel is determined as the additional pixel and is transmitted to the receiver end together with its positional information. In this manner, a portion in the original picture which portion shows an abrupt change can be faithfully reconstructed at the receiver end.

In the embodiment explained above, the additional pixels are transmitted in the form of the values or amplitudes of the pixels. However, according to the invention, it is possible to transmit an amount of interpolation error produced by the subtraction circuit 30 instead of a pixel value itself. In case of using the interpolation error as the additional pixel information, the amplitudes of the interpolation errors are distributed about a zero value and are confined within a narrow range. Therefore, when the amplitudes of the interpolation errors are multiplexed, the number of additional pixels which are transmitted can be increased.

In the embodiment so far explained, since the frequency bandwidth of the high definition television signal can be compressed to 8.1 MHz, the television signal can be transmitted over a single channel of a broadcasting satellite. Further, in a third of the entire picture area all the pixels are always transmitted, and the frame interpolation is effected by using the reconstructed image of a preceding frame. Therefore, after three frames, a still picture image can be reproduced faithfully. According to the invention, the high definition television signal can be transmitted over a single channel of the broadcasting satellite, and further the image quality of the moving picture can be improved materially, because the additional pixels representing details are transmitted in each field.

Figure 5:
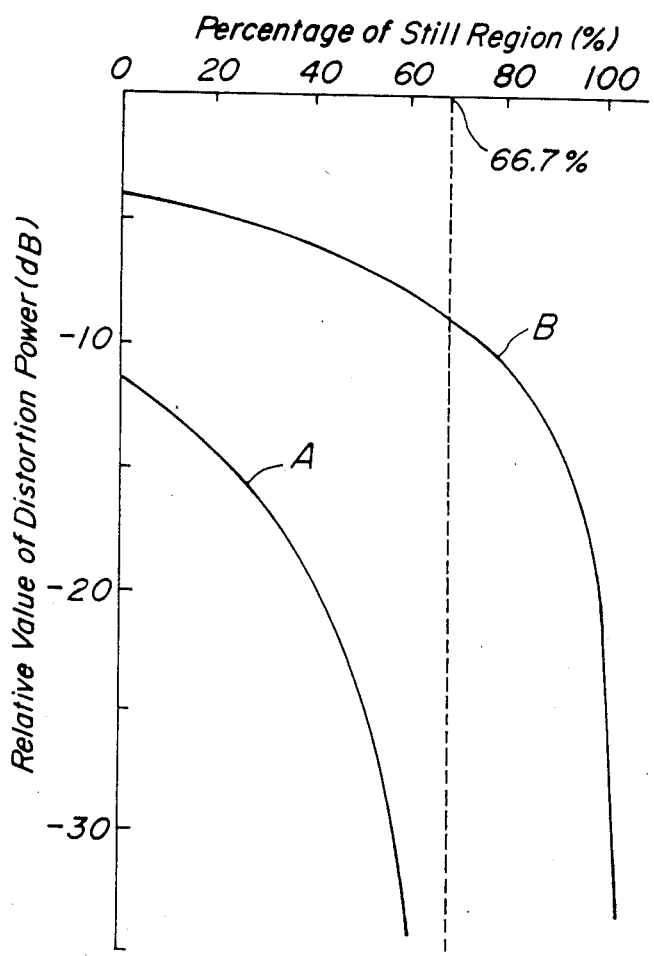
FIG. 5 is a graph showing a relation between a percentage of still region in an image and a distortion power in a reconstructed image.

FIG. 5 is a graph illustrating an operational function of the present invention. An abscissa indicates a percentage of a still region among the whole picture region and an ordinate represents a relative value of mean square value of distortion due to the frequency bandwidth compression, i.e. a relative value of distortion power. A curve A indicates the present invention and a curve B represents the prior art. When the percentage of still region is zero, the whole image is moving (motional picture), whereas when the percentage of still region is equal to 100%, the whole image is stationary (still picture). It should be noted that if the frame interpolation is not effected, the percentage of still region may be recognized to be zero. According to the invention, the distortion can be improved greatly by about 7 dB with respect to the known system even if the whole image is moving. The larger the percentage of still region is, the more the improvement can be attained. Particularly, in a range in which the percentage of still region is larger than 66.7%, the distortion power can be made zero in the system according to the invention. Contrary to this, in the known system since the detail in the moving region is lost and a distortion is always generated. Therefore, it is impossible to make the distortion null except for the completely still picture.

Figure 6:
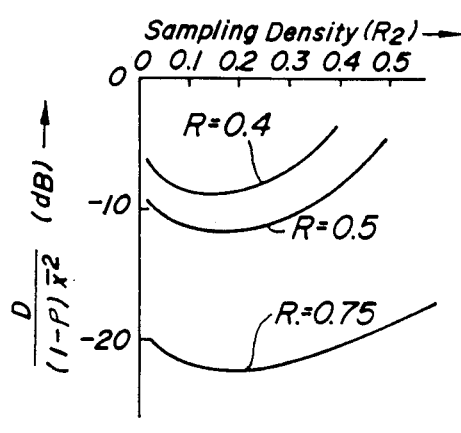
FIG. 6 is a graph representing a relation between a sampling density and a distortion power.
Figure 7:
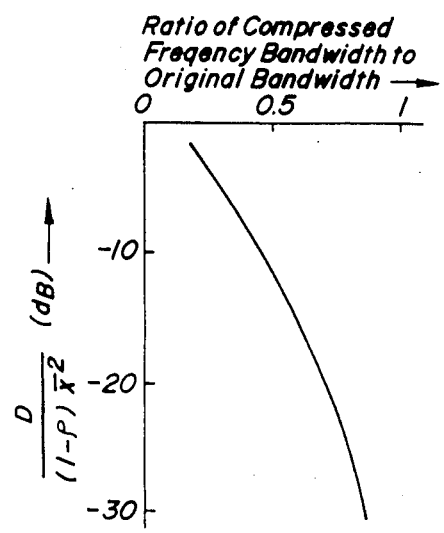
FIG. 7 is a graph illustrating a relation between the ratio of compressed frequency bandwidth to original bandwidth and a distortion power.
Figure 8:
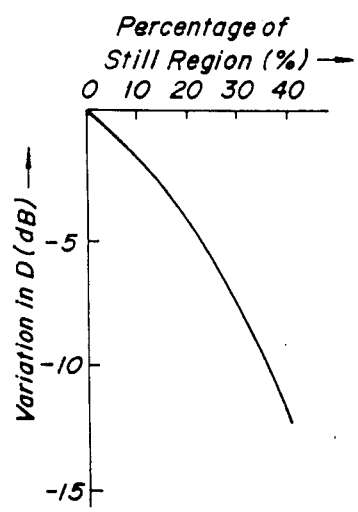
FIG. 8 is a graph showing a relation between a percentage of still region and a distortion power.

The effect of the present invention will be further explained with reference to FIGS. 6, 7 and 8. FIG. 6 shows a relation between the distortion power D and a sampling density $R_2$ ($<1$) which is a ratio of the sampling of the basic pixels shown in FIG. 3B with respect to the sampling of the input image signal depicted in FIG. 3A. In this case, in all detail portions, the additional pixels are transmitted, but the interpolation between frames and the multiple transmission for the interpolation error are not effected. In FIG. 6, R represents compressed frequency bandwidth normalized by the original bandwidth, $\rho$ is correlation coefficient between adjacent pixels and $x^2$ is a signal power. For each R, there is an optimum $R_2$ for reducing the distortion power D to the minimum values, and the variation of D near the optimum $R_2$ is small. FIG. 7 shows a relation between the normalized frequency bandwidth (R) and the distortion power in case of the optimum $R_2$. If there is a still region in an image, the distortion power is made small by means of the frame interpolation as shown in FIG. 8 which shows a case of $R=0.5$. As can be seen from a curve shown in FIG. 8, when the image includes the still region percentage of 20%, the distortion is improved by 4 dB, and when the still region percentage is 40%, there can be obtained an improvement in the distortion power by 13 dB. Further when the additional pixel value is transmitted as the interpolation error in the multiplex mode, the number of additional pixels is increased. Therefore, the distortion power D can be further improved. That is to say, when $R=0.5$, if interporation errors of two additional pixels are multiplexed into a single sample, the distortion power can be decreased by 20 dB, and if interpolation errors of three additional pixels are multiplexed into two samples, the distortion power can be improved by 7 dB. It should be noted that in the graph shown in FIG. 5, the sampling density $R_2$ is set to 0.25.

The inventor has conducted various simulation tests for the known bandwidth compression system and the novel bandwidth compression system according to the invention for various types of moving images. In the system according to the invention, there could not be found any difference between the original image and the reconstructed image, but in the known system there were clearly recognized obscured portions. Further, the image quality according to the inventon is superior to that according to the known system. In this manner, according to the invention, the decrease in definition of the moving image can be avoided almost completely and thus the practical value of the bandwidth compression system according to the invention is very remarkable.

Further, when the present invention is applied to video tape recorder and video disc system, it is possible to prolong the recording time and to improve the image quality. Further, according to the invention when the frame interpolation is not effected, the detail of the original image is not affected by the frequency bandwidth compression unless the whole image is composed of only detail regions. Therefore, the present invention can be utilized to improve the image quality of still video.

The present invention is not limited to the embodiments explained above, but many modifications and alternations can be conceived by those skilled in the art within the scope of the invention. In the above embodiment, the original high definition image is sampled by the sampling frequency of 64.8 MHz and the pixels are reduced to a quarter of that of the original sampled signal. However, the original high definition image signal may be sampled at a lower sampling frequency such as 43.2 MHz and then a quarter of pixels of the sampled image signal may be deleted by the compression system according to the invention. In this case, the number of basic pixels may be equal to that or additional pixels or the number of basic pixels may be larger or smaller than that of additional pixels.

Further, in the above explained embodiment, when a basic pixel of the relevant image is the same as a corresponding basic pixel in the preceding image which is to be reconstructed at the receiver end, one or more pixels neighboring the relevant basic image of the preceding image are selected, and when a basic pixel of the relevant image is different from a corresponding pixel of the preceding image, one or more pixels neighboring the related basic pixel in the relevant image are selected, and then the thus selected pixels are compared with corresponding pixels in the relevant image to produce the interpolation errors. However, according to the invention, it is also possible to compare a basic pixel of the relevant image with a corresponding basic pixel of the preceding image to produce a difference therebetween and one or more new pixels may be formed from one or more pixels neighboring the related basic pixel in the relevant image and/or pixels in the preceding image in accordance with the difference and the thus formed pixels may be compared with corresponding pixels in the relevant image to produce interpolation errors. For instance, the pixel may be formed by calculating a weighted sum of pixels of the relevant and preceding images, whereby weight coefficients may be determined in accordance with said difference.

What is claimed is:

1. A system for compressing a bandwidth of an image signal comprising:
   at a transmitter end
   deriving from an original image basic pixels whose positions in the image have been predetermined;
   deriving from the original image additional pixels whose positions are varied in accordance with a property of the original image;
   deriving position signals of the additional pixels; and
   transmitting the basic and additional pixels and position signals of the additional pixels in such a manner that the basic and additional pixels can be separated from each other without the position signals; and
   at a receiver end
   separating the transmitted basic and additional pixels and position signals from each other; and
   reconstructing an image from both the basic and additional pixels under the control of the position signals when there is no error in the position signals and from only the basic pixels when there is an error in the position signals.

2. A system according to claim 1, wherein the additional pixels are transmitted as amplitudes of image signals at the additional pixels.

3. A system according to claim 1, wherein the basic pixels are uniformly derived from the original image.

4. A system according to claim 1, wherein the basic pixels are non-uniformly derived from the original image.

5. A system according to claim 4, wherein in a central portion of the original image are derived a larger number of basic pixels than in the peripheral portion of the original image.

6. A system according to claim 1, wherein the positions of the additional pixels are determined by comparing each of the basic pixels with corresponding one of basic pixels of a preceding image which is to be reconstructed at the receiver end and has been stored in a memory means of the transmitter end.

7. A system according to claim 6, wherein a basic pixel of the relevant image is compared with a corresponding basic pixel in the preceding image to derive a difference therebetween, one or more pixels neighboring the relevant basic pixel are formed in accordance with said difference by pixels neighboring the related pixel of the relevant image and/or pixels neighboring the related basic pixel of the preceding image, and the pixels thus formed are compared with corresponding pixels in the relevant image to produce interpolation errors, and the additional pixels to be transmitted are determined in accordance with the interpolation error.

8. A system according to claim 7, wherein pixels of the preceding image other than the basic pixels are also stored in the memory means of the transmitter end, pixel other than the basic pixels in the relevant image are interpolated from the basic pixels and when a basix pixel of the relevant image is the same as a corresponding basic pixel in the preceding image, one or more pixels neighboring the relevant basic pixel of the preceding image are selected, whereas when a basic pixel of the relevant image is different from a corresponding basic pixel in the preceding image, one or more pixels neighboring the related basic pixels in the relevant image are selected, the pixels thus selected are compared with corresponding pixels in the relevant image to produce interpolation errors, and the additional pixels to be transmitted are determined in accordance with the interpolation errors.

9. A system according to claim 6 or 7, wherein amplitudes of image signals at the additional pixels are transmitted as the additional pixels.

10. A system according to claim 9, wherein amplitudes of a predetermined number of pixels providing the largest interpolation errors are transmitted as the additional pixels.

11. A system according to claim 6 or 7, wherein values of interpolation errors of the additional pixels are transmitted as the additional pixels.

12. A system according to claim 11, wherein a predetermined number of interpolation errors having the largest values are transmitted as the additional pixels.

13. A system according to claim 7 or 8, wherein the original image is divided into a number of blocks each including a plurality of pixels, when pixels in a block interpolated from the basic pixels are different from actual pixels in the relevant block, all the pixels in the relevant block except for one or more basic pixels are transmitted as the additional pixels together with a position signal representing a position of the relevant block in the image.

14. A system according to claim 13, wherein a sum of errors between the interpolated pixels and the actual pixels in each block is calculated and one or more blocks whose pixels except for basic pixels are to be transmitted are determined in accordance with the sums of errors.

15. A system according to claim 14, wherein a predetermined number of blocks having the largest sums are determined as those whose pixels except for the basic pixels are transmitted as the additional pixels.

16. A system according to claim 1, in order to transmit a high definition television signal over a single channel of a broadcasting satellite, about a half of the number of pixel of the high definition television signal is deleted and then about a half of the remaining pixels is reduced by making a sum of the basic and additional pixel numbers equal to about a quarter of the whole number of pixels of the original high definition television signal.

17. A system according to claim 16, wherein the basic and additional pixels are transmitted during a vertical tracing period and the position signals of the additional pixels are transmitted during a vertical blanking period.

18. A system according to claim 17, wherein the basic pixels are transmitted in one half of the vertical tracing period and the additional pixels are transmitted in the other half of the vertical tracing period.

19. A system according to claim 17, wherein the basic pixels are transmitted on one of odd and even horizontal scanning lines and the additional pixels are transmitted on the other of odd and even horizontal scanning lines.

20. A system according to claim 1, wherein pixels in the relevant image other than the basic pixels are interpolated, interpolated pixels are compared with corresponding pixels in the relevant image to produce interpolation errors, and the additional pixels to be transmitted are determined in accordance with the interpolation errors.

21. A system according to claim 20, wherein amplitudes of image signals at the additional pixels are transmitted as the additional pixels.

22. A system according to claim 21, wherein amplitudes of a predetermined number of pixels providing the largest interpolation errors are transmitted as the addition pixels.

23. A system according to claim 20, wherein values of interpolation errors of the additional pixels are transmitted as the additional pixels.

24. A system according to claim 23, wherein a predetermined number of interpolation errors having the largest values are transmitted as the additional pixels.

25. A system according to claim 20, wherein the original image is divided into a number of blocks each including a plurality of pixels, when pixels in a block interpolated from the basic pixels are different from actual pixels in the relevant block, all the pixels in the relevant block except for one or more basic pixels are transmitted as the additional pixels together with a position signal representing a position of the relevant block in the image.

26. A system according to claim 25, wherein a sum of errors between the inerpolated pixels and the actual pixels in each block is calculated and one or more blocks whose pixels except for basic pixels are to be transmitted are determined in accordance with the sums of errors.

27. A system according to claim 26, wherein a predetermined number of blocks having the largest sums are determined as those whose pixels except for the basic pixels are transmitted as the additional pixels.

* * * * *